(12) United States Patent
VanValkenburgh (10) Patent No.: US 8,517,343 B1
(45) Date of Patent: Aug. 27, 2013

(54) DUAL PURPOSE FRONT MOTORCYCLE STAND

(75) Inventor: Charles N. VanValkenburgh, Huntsville, AL (US)

(73) Assignee: Pit Bull Products, Inc., Huntsville, AL (US)

( * ) Notice: Subject to any disclaimer, the term of this patent is extended or adjusted under 35 U.S.C. 154(b) by 94 days.

(21) Appl. No.: 13/368,188

(22) Filed: Feb. 7, 2012

(51) Int. Cl.
- *B66F 3/00* (2006.01)
- *B66F 7/24* (2006.01)
- *B60P 3/07* (2006.01)
- *B62B 3/04* (2006.01)
- *B62H 7/00* (2006.01)
- *B25B 27/14* (2006.01)
- *B66F 9/065* (2006.01)

(52) U.S. Cl.
USPC ............... 254/131; 254/8 R; 280/293; 29/273

(58) Field of Classification Search
USPC .................... 254/131, 8 R; 280/293; 29/273
See application file for complete search history.

(56) References Cited

U.S. PATENT DOCUMENTS

| | | | |
|---|---|---|---|
| 6,836,942 B2 * | 1/2005 | Oleski | 29/273 |
| 6,981,694 B2 * | 1/2006 | Carnahan | 254/8 R |
| 7,000,901 B1 * | 2/2006 | VanValkenburgh | 254/131 |
| 7,188,854 B1 * | 3/2007 | Pickens | 280/293 |
| 7,648,317 B2 * | 1/2010 | Kobacker et al. | 410/3 |
| 8,371,598 B2 * | 2/2013 | VanValkenburgh | 280/293 |

* cited by examiner

*Primary Examiner* — Lee D Wilson
*Assistant Examiner* — Alvin Grant (57) ABSTRACT

The motorcycle stand is capable of lifting the front of a motorcycle from either below the front axle or from the hollow steering stem of the motorcycle with no reconfiguration. The modular design also allows components to be removed or omitted to make it capable of lifting from one location or the other with less weight and a lower purchase cost. It's unique and innovative pivot axis uses the outside diameter of two co-linear tubes to lift from the steering stem. The inside diameter of the same tubes serve as pivots for swivel components that lift from below the front axle. A unique method of index-able, height adjustability allow the user to tailor to his/her preference for leverage or to adapt to a specific motorcycle.

10 Claims, 8 Drawing Sheets

DUAL PURPOSE FRONT MOTORCYCLE STAND

BACKGROUND OF THE INVENTION

The present invention relates generally to motorcycle stands.

Figure 1:
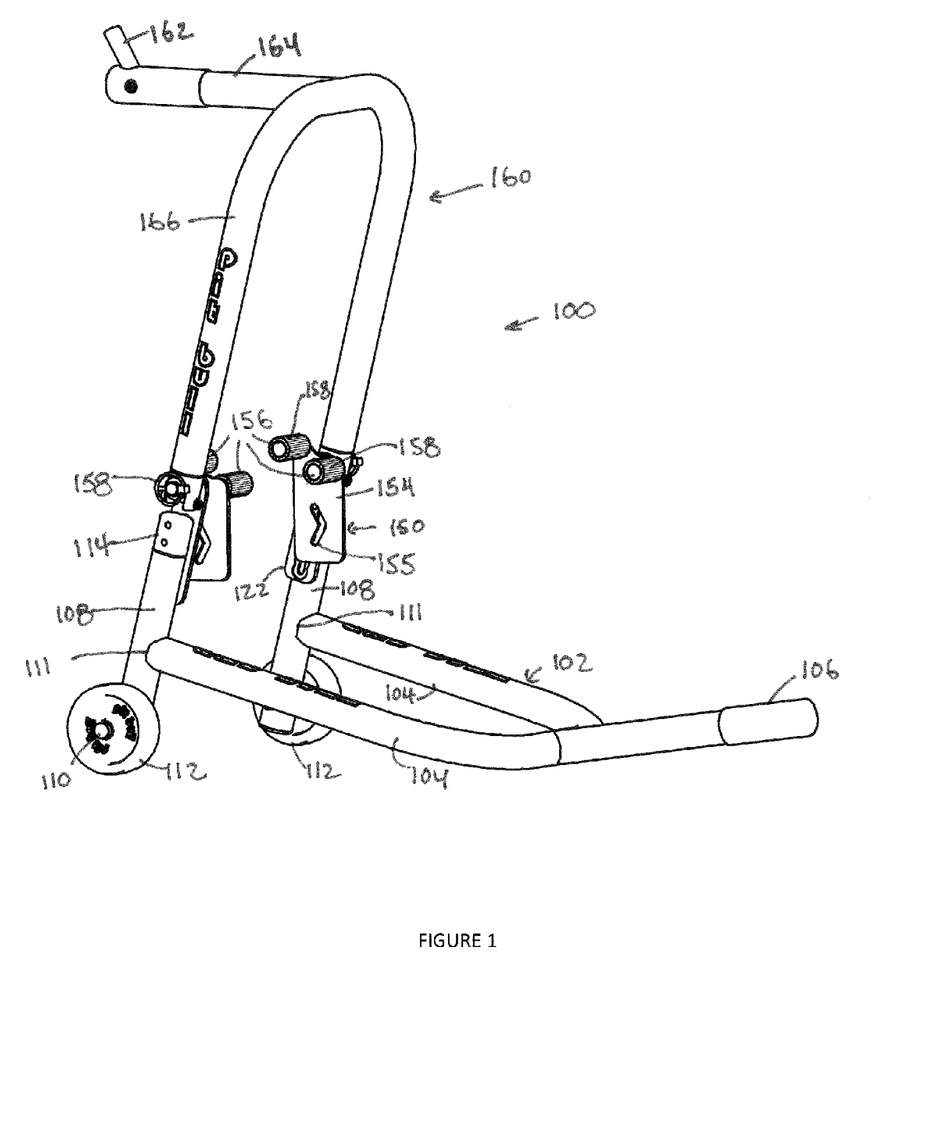
FIG. 1 is a view of the motorcycle stand complete and configured to lift from steering stem or from under the axle.
Figure 2:
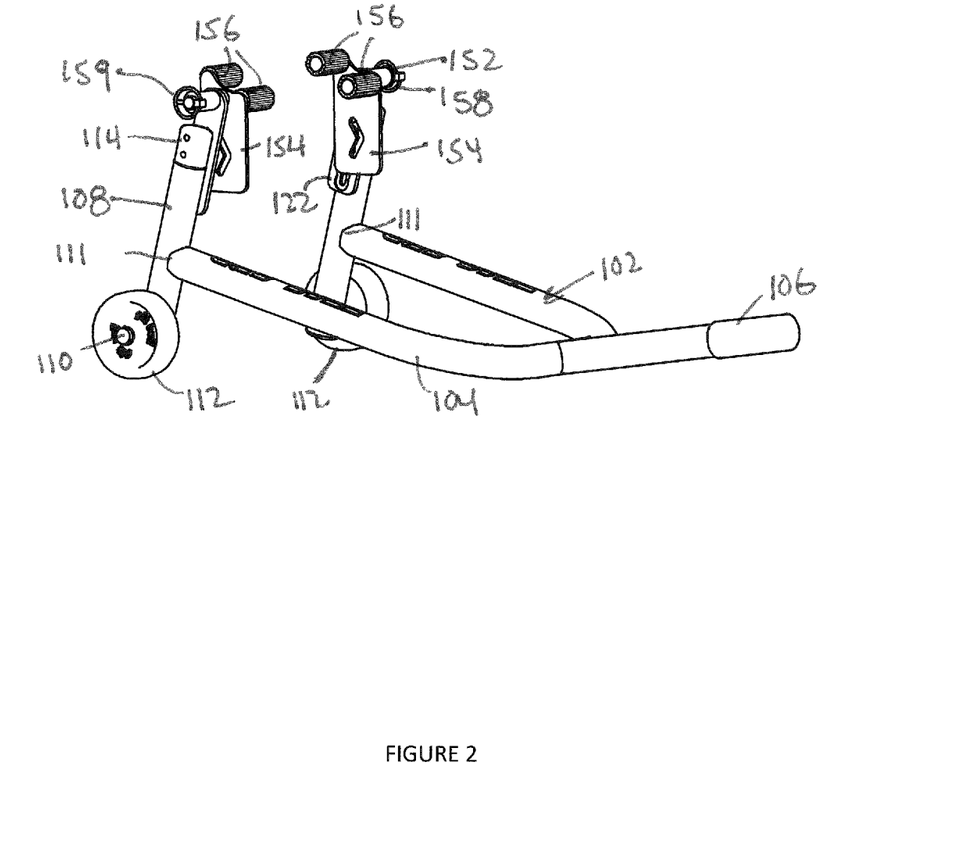
FIG. 2 is a view of the motorcycle stand configured to lift only from below the front axle.
Figure 3:
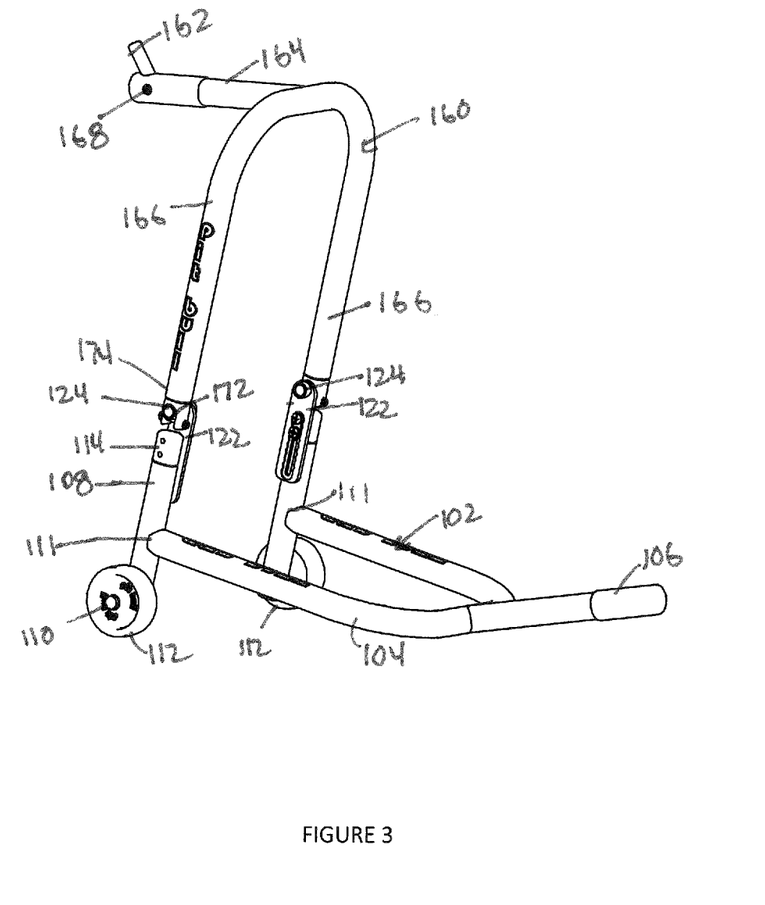
FIG. 3 is a view of the motorcycle stand configured to lift only from the steering stem.
Figure 4:
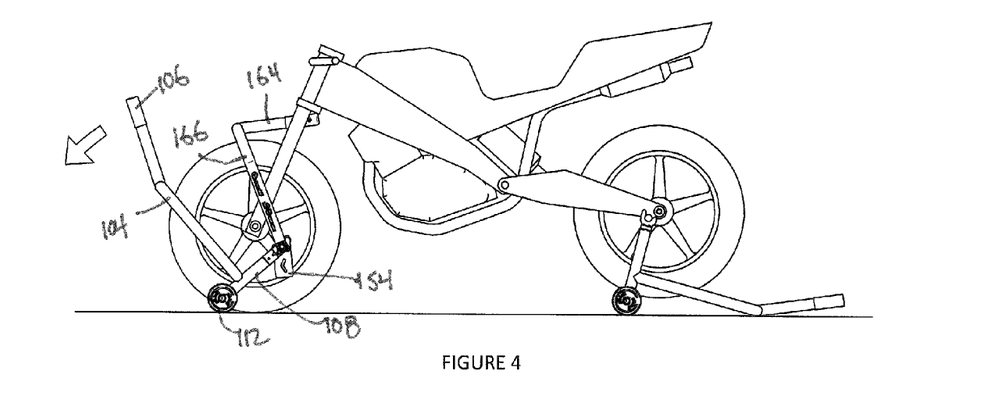
FIG. 4 is a view of the motorcycle stand beginning to lift the front of the motorcycle from the steering stem.
Figure 5:
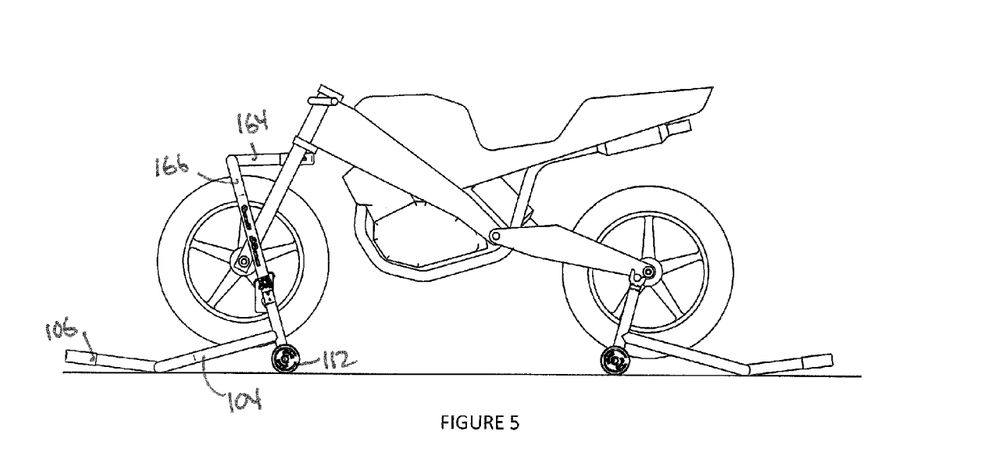
FIG. 5 is a view of the motorcycle stand holding the front of the motorcycle off the ground from the steering stem.
Figure 6:
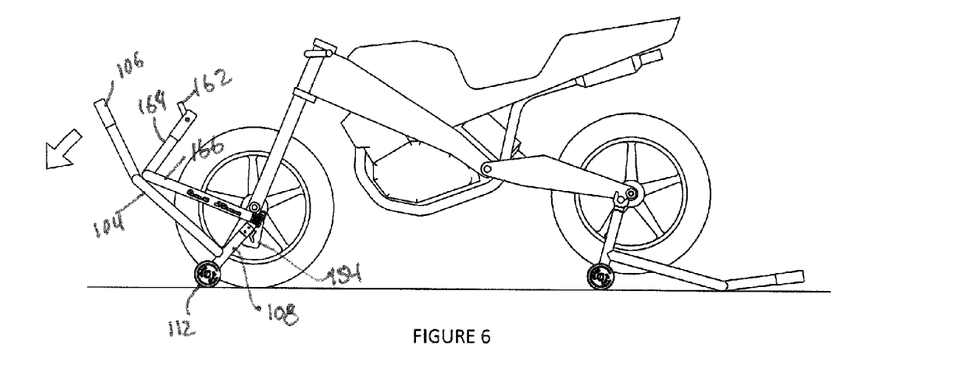
FIG. 6 is a view of the motorcycle stand beginning to lift the front of the motorcycle from below the front axle.
Figure 7:
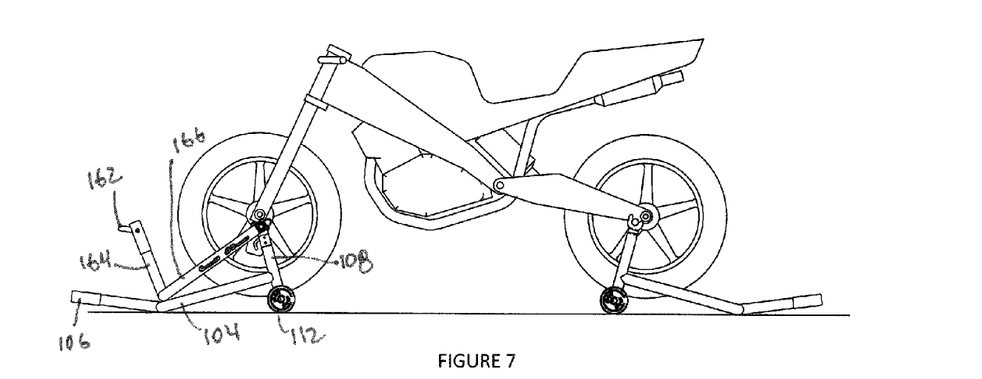
FIG. 7 is a view of the motorcycle stand holding the front of the motorcycle off the ground from below the front axle.
Figure 8:
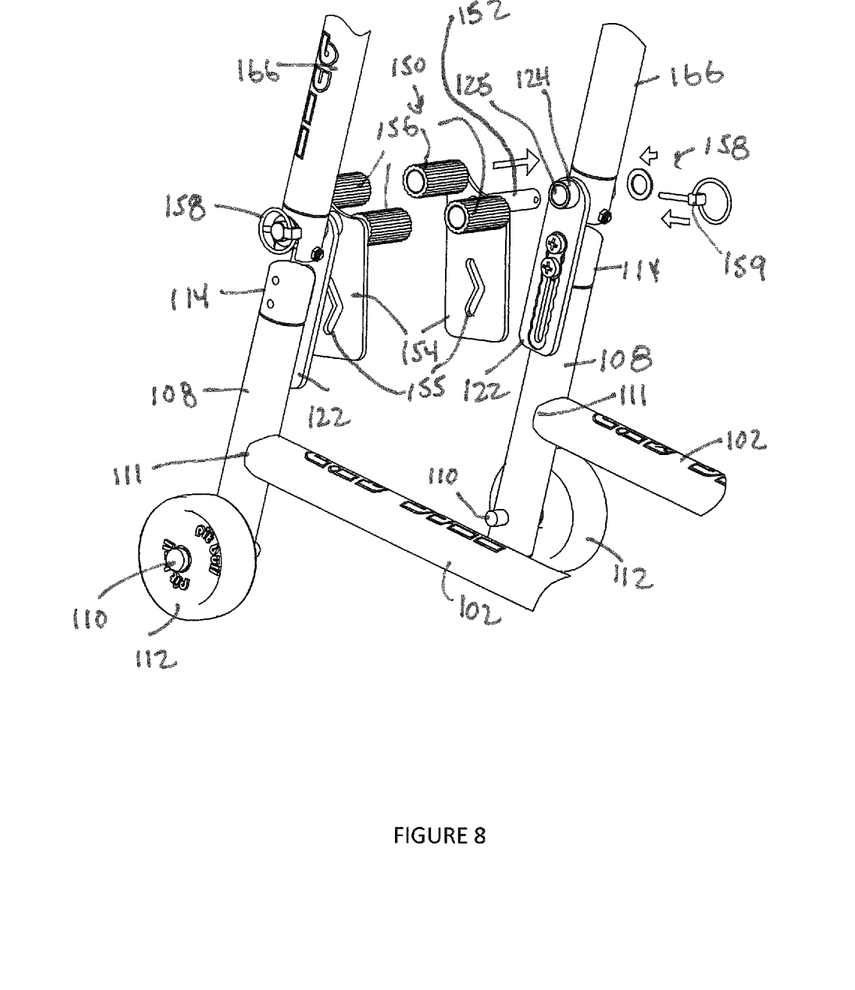
FIG. 8 is an exploded view of the motorcycle stand showing the swivel components being removed for lifting from below the front axle.
Figure 9:
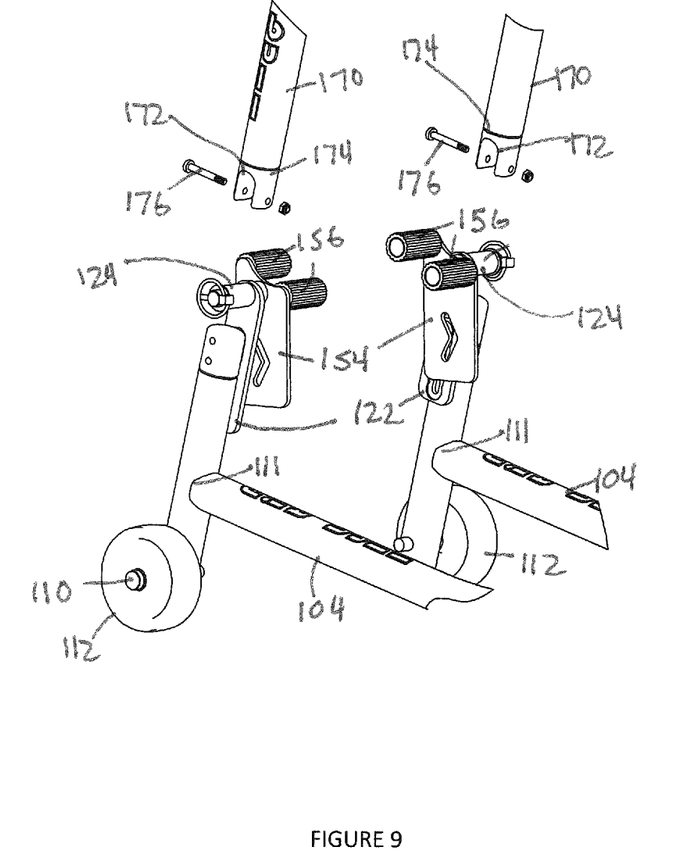
FIG. 9 is an exploded view of the motorcycle stand showing components removed that would allow lifting from the steering stem.
Figure 10:
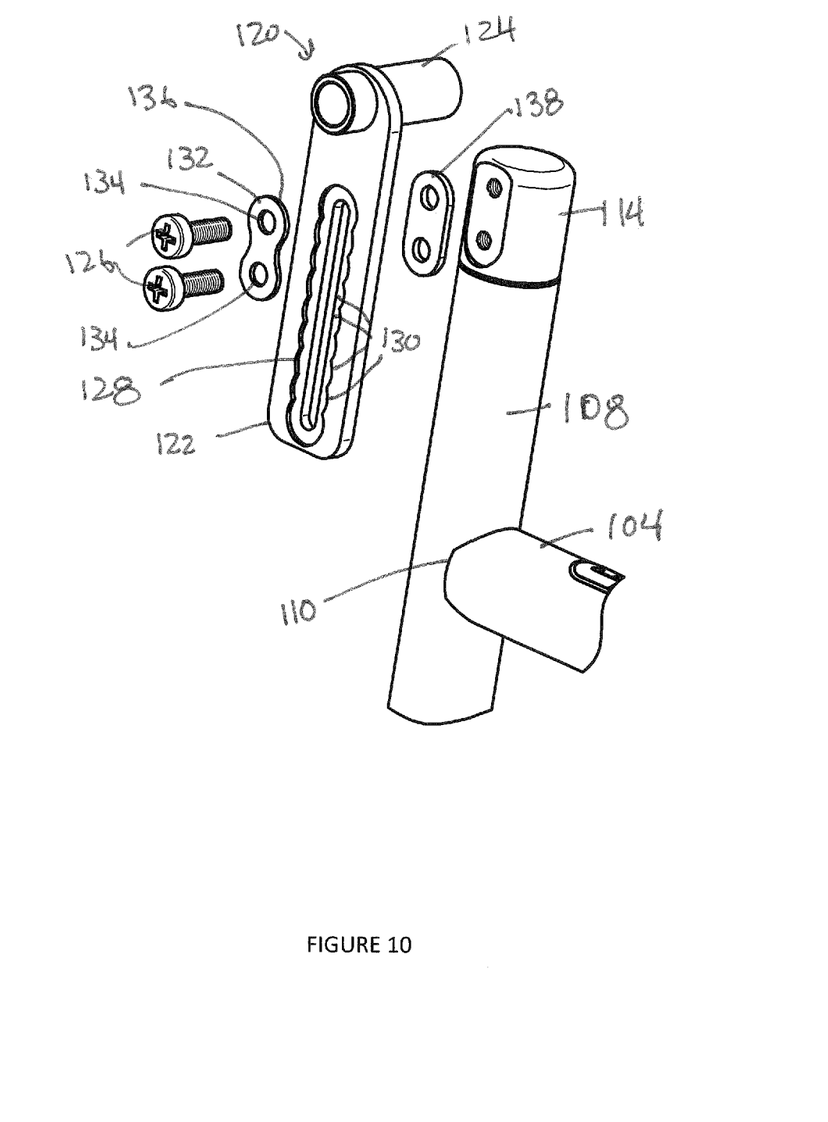
FIG. 10 is an exploded view showing height adjustment capability.

More particularly, this invention pertains to a versatile motorcycle stand that can be selectively configured to lift the front of a motorcycle from either of two lift points. The two lift points as commonly accepted by the motorcycle industry are A) below the front axle; and B) from the steering stem. Configuration is modular and can be manipulated by the user. The motorcycle stand can be used with modular components as shown in FIG. 1 that allow lifting from either lift points. The stand can also be configured to lift the motorcycle only from below the front axle as shown in FIG. 2, or only from the steering stem as shown in FIG. 3. The benefit of using the stand with all components installed is that it is always ready to be used in either mode. Benefits of using the stand with components removed include a) lower purchase price, and b) lighter weight.

A front motorcycle stand is a popular way of raising the front of a motorcycle off the ground for maintenance. The front of the motorcycle is normally lifted after the rear has been raised and held vertical as viewed from the front or rear by a rear motorcycle stand or center stand. A front motorcycle stand raises the front of the motorcycle high enough for maintenance including front wheel removal, front wheel cleaning or front fork tube removal. Lifting the front of a motorcycle from below the front axle allows front wheel cleaning and removal. Lifting from the steering stem allows front wheel cleaning and removal and front fork tube removal. Advantages of lifting the motorcycle from below the front axle are a) the fit is relatively universal in that it does not require special adaptation to the specific motorcycle, and b) it is generally quicker than lifting from the steering stem. Lifting the motorcycle from the steering stem provides additional capability but generally requires the user to employ an adaptive metal pin fitted to the steering stem of the specific motorcycle.

Prior art methods of lifting the front of a motorcycle involved separate devices for either lifting from below the axle or from the steering stem of the motorcycle. An invention branded by Pit Bull motorcycle stands since 1999 included an adaptation to the stand that allows a motorcycle stand intended to lift from below the front axle to lift from the steering stem by adding a component designated to lift from the steering stem. This system was unique but adapting it to lift from the steering stem precluded lifting from below the axle until the steering stem adaptation was removed.

Generally, a stand lifts the front of the motorcycle upward as the user applies downward force. A pivot or hinge point transfers the downward motion into upward movement to lift the motorcycle. That pivot point is also where the elements that lift from below the axle or from the steering stem connect.

Other prior art have used one stand to lift from the steering stem and from below the front axle. These stands have required removal of the steering stem lift elements to insert the axle lift elements since each component hinges from the same internal hole or sleeve.

BRIEF SUMMARY OF THE INVENTION

The present invention is a device for lifting the front of a motorcycle. It is capable of lifting the motorcycle from either the hollow steering stem or from below the front axle. It consists of a lower leverage device with height adjustable pivot axes consisting of co-linear tubes of which the outside diameter is used to lift from the hollow steering stem and the inside diameter is used to lift from below the front axle.

The new motorcycle stand has separate components for lifting from the steering stem and below the front axle. Each of these components may be removed or omitted to save weight and/or purchase price. Component removal and replacement can be done easily by the user. Index-able height adjustability is a feature of this motorcycle stand allowing the user to better tailor to his needs or to better fit a specific motorcycle.

BRIEF DESCRIPTION OF THE DRAWINGS

A fuller understanding of the foregoing may be had by reference to the accompanying drawings, wherein.

DETAILED DESCRIPTION OF THE INVENTION

The present invention is new device for lifting the front of the motorcycle from the steering stem of the motorcycle or from below the front axle of the motorcycle. The motorcycle stand can lift from either location without adding or removing any components. It can also be used to lift from one location by removing components used for lifting from the other location.

Referring now to FIGS. 1 through 10, the motorcycle stand 100 includes a lower leverage device 102 with a U-shaped hoop 104 and handle 106 to provide leverage. Two upright tubes 108 separately attach to the ends 111 of the hoop 104 and each upright tube 108 has an axle 110 and wheel 112 to reduce friction and assist in leverage. Pivot components 120 consisting of a plate 122 and pivot tube 124, with a slot 125 through the pivot tube 124, joined together are attached to the top 114 of each upright tube 108 with two bolts 126. The plates 122 are slotted 128 to allow height adjustability. A series of circular notches 130 line the slot 128 at regular intervals. A special washer 132 with two holes 134 and an outside shape 136 corresponds to the notches 130 in the plate 122 allowing the height of the plates 122 to be fixed at regular intervals when tightened by the two bolts 126. An inside washer 138 is provided between the plate 122 and the top 114 of each upright tube 108.

The pivot tubes 124 are arranged co-linear with respect to each other and have the following two functions. First, their inside diameters serve as pivot axes for swivel devices 150 intended to lift from under the front axle. Second, their outside diameters serve collectively as a pivot axis for the upper leverage device 160 of the stand 100 intended to lift from the steering stem.

Swivel devices 150 insert into the pivot tubes 124 on each side to enable the motorcycle stand to lift from below the front axle. Each swivel device 150 has a shaft 152 to allow it to swivel. A plate 154 attached to the shaft 152 serves to a) act as a counterweight, and b) support two pegs 156 covered with rubber-like material 158 intended to reduce slippage and prevent scratching of the fork tubes. One peg 156 typically supports the weight of the bottom of the motorcycle front fork tube while the other peg 156 butts against the back of the fork tube to prevent it from sliding off the stand. The user typically positions the motorcycle stand such that the pegs 156 are positioned with one below the fork tube and one just behind the fork tube. Once the pegs 156 are in position, the user pushes down on the handle 106 of the lower leverage 102 device to lift the front of the motorcycle off the ground. The fact that the swivel devices 150 are able to move independently allows the pegs 156 to firmly grip the bottom of the fork tube regardless of whether the fork tubes are slightly uneven or the ground below the motorcycle is uneven. User-actuated fasteners 159 allow the swivel devices to be removed or replaced in the field. Fasteners 159 can include a locking pin inserted perpendicular to the shaft or an external clamping device. Directional arrows 155 on the plate 154 indicate the front of the motorcycle and ensure the user re-installs the swivel devices correctly.

The motorcycle stand is also capable of lifting the front of the motorcycle from the hollow steering stem via an upper leverage device 160. Typically, the steering stem of the motorcycle consists of a hollow shaft that rotates with respect to the frame. The front wheel is linked to the steering stem via the fork tubes. Therefore, rotating the steering stem rotates the front wheel to steer the motorcycle. The hole through the center of the steering stem shaft varies slightly from one motorcycle to the other. For that reason the stand uses interchangeable pins 162 to correctly fit the specific motorcycle. The pin 162 is held by the motorcycle stand 100 in a relatively straight tubular member 164 that is connected to an inverted U-shaped member 166 of the upper leverage device 160. It inserts into a hole in the tubular member 164 and is locked in place with a smaller, perpendicularly installed screw or pin 168 or similar locking device. A special adaptive shape can be used in place of the pin to lift motorcycles that do not have hollow steering stems. The U-shaped member 166 includes legs 170 that are notched 172 on the bottom 174 to pivot around the co-linear pivot tubes such that pushing down on the handle of the lower leverage device lifts the front of the motorcycle after the pin is inserted into the steering stem of the motorcycle. The notches 172 are open on the bottom of the U-shaped member 166 to allow the upper and lower leverage devices 160, 102 respectively, to be mated or de-mated by the user. User-actuated screws 176 or pins are installed to prevent or allow separation of the upper and lower leverage devices.

The invention thus provides for various aspects including: A front motorcycle stand that can lift from below the front axle of the motorcycle or from the hollow steering stem without interchange of parts or components. A front motorcycle stand that can be used solely to lift from below the front axle or the steering stem by eliminating parts or components used to lift from the other location. A front motorcycle stand that uses the outside diameter of two co-linear cylinders as the collective pivot point linking the upper and lower leverage members to lift the front of a motorcycle from the steering stem or the same motorcycle stand that uses the inside diameter of the same two co-linear cylinders as pivot points for supports to lift the front of a motorcycle from below the front axle. A front motorcycle stand that can lift the front of the motorcycle from the steering stem or from below the front axle with all components attached to allow lifting from the other location without interference from those components. A front motorcycle stand that has index-able height adjustability consisting of washers that fit into mating notches at regular height intervals. A front motorcycle stand that lifts from below the front axle that has removable swivel components with directional arrows to ensure they are re-installed correctly.

I claim:

1. A front motorcycle stand for use with a motorcycle, comprising:
   a lower leverage device defined as having a U-shaped hoop having two legs extending outwardly from a closed end and a handle extending from the closed end, the lower leverage device having a pair of pivot component assemblies being spaced apart and opposed from one another, each pivot component assembly having a pivot tube;
   a pair of swivel devices, each swivel device having a shaft being inserted into and freely rotatable within the pivot tube, each swivel device further includes at least one peg for position against a front fork tube defined on a motorcycle; and
   an upper leverage device having an upper inverted U shaped member, the U shaped member defined by having a pair of spaced apart upper leverage legs extending from a curved tubular member, the upper leverage device further having a member to secure against a center of a steering stem defined by the motorcycle, and ends of the upper leverage legs are pivotally secured about the pivot tubes, such that pushing the handle on the lower leverage device lifts a front portion of the motorcycle.

2. The stand of claim 1, wherein the ends of the upper leverage legs include notches for receiving the pivot tubes.

3. The stand of claim 1, wherein the lower leverage device being further defined as having:
   two tubes separately attached to ends of the two legs of the U-shaped hoop in a substantially perpendicular angle from the two legs, each tube includes an upper end; and
   the pair of pivot component assemblies being separately attached to the upper end of each tube, each pivot component assembly having said pivot tube.

4. The stand of claim 1, wherein each swivel device further includes a plate attached to the shaft, the plate having a pair of pegs extending toward each other, one of the pair of pegs being defined to support a front fork tube defined on a motorcycle while the second peg rests against a side of the fork tube, such that pushing on the handle lifts a front portion of the motorcycle and the swivel devices move independently allowing the pegs to grip the fork tube.

5. The stand of claim 4 wherein each plate includes a directional arrow indicating placement of the plate towards a front portion of the motorcycle.

6. The stand of claim 1, wherein each tube of the lower leverage device includes a wheel attached to the tube by an axle.

7. The stand of claim 1, wherein each pivot component assembly has a plate attached to the upper end of each tube and a pivot tube extending from the plate, the pivot tube having said pivot slot defined therethrough, and each plate further having an elongated slot which permits vertical movement of the plate with respect to the upper end of each tube.

8. The stand of claim 1, wherein vertical adjustment of the plate is further defined by having a series of circular notches along the elongated slot and a washer having an external profile corresponding to the circular notches, the washer being inserted into the circular notches to fix the plate into a predetermined position.

9. The stand of claim 1, wherein the pivot tubes are co-linear with respect to each other and each pivot tube has an inside diameter that acts as a pivot axis for swivel devices intended to lift from under a front axle defined on a motorcycle and each pivot tube has an outside diameter that acts as a pivot axis for the upper leverage device of the stand to lift a steering stem defined on said motorcycle.

10. The stand of claim 1, wherein the member of the upper leverage device is defined as a rod extending from the curved tubular member for insertion through a lower opening through a center of a steering stem defined by the motorcycle.

* * * * *